(12) United States Patent
Kosmicki et al.

(10) Patent No.: US 9,957,828 B2
(45) Date of Patent: May 1, 2018

(54) SHAFT SEAL ASSEMBLY WITH CONTAMINANT DETECTION SYSTEM

(71) Applicant: Weir Slurry Group, Inc., Madison, WI (US)

(72) Inventors: Randy J. Kosmicki, Edgerton, WI (US); Michael L. Viken, Cottage Grove, WI (US)

(73) Assignee: Weir Slurry Group, Inc., Madison, WI (US)

( * ) Notice: Subject to any disclaimer, the term of this patent is extended or adjusted under 35 U.S.C. 154(b) by 539 days.

(21) Appl. No.: 14/510,585

(22) Filed: Oct. 9, 2014

(65) Prior Publication Data

US 2015/0104291 A1 Apr. 16, 2015

Related U.S. Application Data

(60) Provisional application No. 61/889,411, filed on Oct. 10, 2013.

(51) Int. Cl.
*F16J 15/16* (2006.01)
*F01D 11/02* (2006.01)
(Continued)

(52) U.S. Cl.
CPC ............ *F01D 11/02* (2013.01); *F01D 11/005* (2013.01); *F01D 15/10* (2013.01); *F01D 17/08* (2013.01);
(Continued)

(58) Field of Classification Search
CPC ...... F01D 11/02; F01D 11/003; F01D 11/005; F01D 25/16; F01D 25/183
See application file for complete search history.

(56) References Cited

U.S. PATENT DOCUMENTS 5,823,541 A * 10/1998 Dietle ................. F04C 15/0038
277/320
5,865,441 A * 2/1999 Orlowski ............. F16J 15/3404
277/364

(Continued)

FOREIGN PATENT DOCUMENTS

DE 4225642 C1 7/1993
WO WO-1990/015273 12/1990
(Continued)

OTHER PUBLICATIONS

International Search Report dated Jan. 21, 2015 in corresponding application No. PCT/US2014/059879, 4 pages.
(Continued)

*Primary Examiner* — Woody Lee, Jr.
(74) *Attorney, Agent, or Firm* — Gardere Wynne Sewell LLP

(57) ABSTRACT

A seal assembly for sealing a fluid passageway from contaminants is disclosed. The fluid passageway is formed by a rotating shaft entering an opening in a housing. The fluid passageway connects an interior of the housing, and any exterior of the housing. The seal assembly includes a first sealing member and a second sealing member, which divides the fluid passage into an interior section, an open section, and a sealed section. The interior section is exposed to the interior of the housing. The sealed section is fluidly sealed between the interior section and the open section. A sensor is disposed within the sealed section. The sensor is configured to sense the contaminants within the sealed section and is electronically coupled to a controller configured to send an alarm signal. The sensor is a moisture sensor and extends into an annular recess formed in the stationary member.

41 Claims, 4 Drawing Sheets

(51) Int. Cl.

| | |
|---|---|
| *F01D 11/00* | (2006.01) |
| *F01D 21/00* | (2006.01) |
| *F01D 25/16* | (2006.01) |
| *F01D 25/18* | (2006.01) |
| *F16C 33/76* | (2006.01) |
| *F16C 19/18* | (2006.01) |
| *F01D 15/10* | (2006.01) |
| *F01D 17/08* | (2006.01) |
| *F02C 7/28* | (2006.01) |
| *F16J 15/00* | (2006.01) |
| *F16J 15/447* | (2006.01) |

(52) U.S. Cl.
CPC ......... *F01D 21/003* (2013.01); *F01D 25/16* (2013.01); *F01D 25/183* (2013.01); *F02C 7/28* (2013.01); *F16C 19/184* (2013.01); *F16C 33/763* (2013.01); *F16J 15/004* (2013.01); *F16J 15/4478* (2013.01); *Y10T 29/49297* (2015.01)

(56) References Cited

U.S. PATENT DOCUMENTS

| | | | | |
|---|---|---|---|---|
| 6,419,233 | B2* | 7/2002 | Orlowski | F16J 15/4478 277/411 |
| 7,118,114 | B2* | 10/2006 | Burdick | F16J 15/004 277/510 |
| 7,396,017 | B2 | 7/2008 | Orlowski et al. | |
| 7,726,661 | B2 | 6/2010 | Orlowski et al. | |
| 7,839,294 | B2* | 11/2010 | Orlowski | B65G 39/09 340/679 |
| 7,871,241 | B2 | 1/2011 | Bourgeois et al. | |
| 2002/0183179 | A1 | 12/2002 | Pienmaki et al. | |
| 2003/0201766 | A1 | 10/2003 | Faetanini et al. | |
| 2004/0100034 | A1* | 5/2004 | Coppola | F01D 11/06 277/412 |
| 2006/0082069 | A1* | 4/2006 | Malavazi | E21B 43/121 277/322 |
| 2007/0085279 | A1 | 4/2007 | Burdick et al. | |
| 2008/0260521 | A1* | 10/2008 | Werro | F01D 11/003 415/170.1 |
| 2012/0018956 | A1 | 1/2012 | Pratt et al. | |

FOREIGN PATENT DOCUMENTS

| | | |
|---|---|---|
| WO | WO-19970034095 | 9/1997 |
| WO | WO-2008/011554 | 1/2008 |
| WO | WO-2009/143213 A2 | 11/2009 |

OTHER PUBLICATIONS

Written Opinion dated Jan. 21, 2015 in corresponding application No. PCT/US2014/059879, 10 pages.
International Preliminary Report on Patentability dated Nov. 27, 2015 in corresponding application No. PCT/US2014/059879, 12 pages.
Supplementary European Search Report dated May 23, 2017 for corresponding EP Patent Application No. EP14852407, 9 pages.

* cited by examiner

SHAFT SEAL ASSEMBLY WITH CONTAMINANT DETECTION SYSTEM

CROSS-REFERENCE TO RELATED APPLICATIONS

This application claims priority to U.S. Provisional Application No. 61/889,411 filed on Oct. 10, 2013, which is incorporated herein by reference in its entirety.

TECHNICAL FIELD

This disclosure relates to seal assemblies for use with rotating equipment, and in particular, to a shaft seal assembly and system for monitoring the integrity of the seal assembly.

BACKGROUND

Shaft sealing devices are commonly used to protect the integrity of the bearing environments in various types of rotating equipment. Many of these sealing devices, however, can quickly wear out and fail. After such failure, contaminants, such as, for example, moisture, oftentimes migrate into the bearing lubrication reservoir (i.e., the isolated side of the sealing device) resulting in damage to the rotating equipment.

Methods are currently used in industry to detect moisture/contaminants on the isolated side of a seal, which notifies a user that the seal integrity has been lost or otherwise compromised. For example when using a mechanical seal to separate an oil filled bearing assembly of a submersible pump from ingress of the pumped media (i.e., water), a sensor is placed in the oil. The detection of moisture in the oil triggers an alarm. For grease filled assemblies, positioning a sensor in the grease oftentimes fails to detect the presence of contaminates. Furthermore, it is common for clean grease to cover the sensing device during initial operation, thereby preventing contaminates from contacting and thus triggering the sensor. Even if the sensors are triggered when the lubricating media is contaminated, the negative effects and damage on the bearings or other components on the isolated side of the seal are likely to have already occurred.

SUMMARY

In a first aspect, there is provided a seal assembly for sealing a fluid passageway from contaminants. The fluid passageway is formed by a rotating shaft entering an opening in a housing. The fluid passageway connects an interior of the housing and an exterior of the housing. The seal assembly includes a first sealing member and a second sealing member, which divides the fluid passage into an interior section, which is exposed to the interior of the housing, an open section, which is exposed to the exterior, and a sealed section, which is fluidly sealed between the interior section and the open section. A sensor is disposed within the sealed section and is configured to sense the contaminants within the sealed section.

In certain embodiments, the seal assembly further includes a stationary member surrounding the shaft and is affixed to the housing. The seal assembly further includes a rotatable member, which is secured to an adjacent portion of the shaft. The rotatable member and the stationary member dividing the fluid passage connecting the interior of the housing to the exterior of the housing.

In other certain embodiments, first sealing member is secured between the rotatable member and the stationary member.

In yet another embodiment, the stationary member and the rotatable member are intermeshed to form a labyrinth in the fluid passageway.

In still another embodiment, the labyrinth is the first sealing member.

In certain embodiments, the second sealing member is secured to the stationary member.

In other certain embodiments, the first and second sealing members are secured to the stationary member.

In yet another embodiment, the rotatable member is a flinger.

In still another embodiment, a port formed in the stationary portion extending from the labyrinth through the stationary portion such that during rotation of the movable member, contaminants exit the labyrinth through the port prior to entering the sealed section.

In certain embodiments, the first sealing member is an elastomeric sealing ring and the second sealing member is an elastomeric sealing ring.

In other embodiments, the shaft couples a motor to a pump.

In other certain embodiments, the sensor is electronically coupled to a controller, which is configured to send an alarm signal indicating the detection of a contaminant.

In yet another embodiment, the sensor is secured to the stationary member and extends into an annular recess formed in the stationary member.

In still another embodiment, the sensor detects moisture.

In certain embodiments, the housing includes a bearing cavity.

In other certain embodiments, the housing includes a bearing cavity in a motor for a pump.

In a second aspect, there is provided a motor for a pump that includes a housing and a rotatable shaft extending through an opening in the housing. The motor further includes a seal assembly surrounding the shaft and sealing against contaminants outside the housing at the opening. The seal assembly includes a stationary member surrounding the shaft and affixed to the housing. A rotatable member is secured to an adjacent portion of the shaft, the rotatable member and the stationary member forming a fluid passage connecting an interior of the housing to an exterior of the housing. A first sealing member and a second sealing member divide the fluid passage into an interior section, which is exposed to the interior of the housing, an open section, which is exposed to the exterior of the housing, and a sealed section disposed between and sealed from the interior section and the open section. At least one sensor is disposed within the sealed section and is configured to sense the contaminants within the sealed section.

In certain embodiments, the stationary member and the rotatable member are intermeshed with each other to form a labyrinth in the fluid passageway.

In other certain embodiments, a port is formed in the stationary member and extends from the labyrinth through the stationary member such that during rotation of the rotatable member, contaminants exit labyrinth through the port prior to entering the sealed section.

In yet another embodiment, the labyrinth is the first sealing member.

In still another embodiment, the at least one sensor is a sensor to detect moisture.

In other certain embodiments, the at least one sensor is electronically coupled to a controller configured to send a signal notifying the detection of the contaminants in the sealed section.

In yet another embodiment, the at least one sensor is secured to the stationary member and extends into an annular recess formed in the stationary member.

In still another embodiment, the first and second sealing members are secured to the stationary member to form the sealed section.

In certain embodiments, the first sealing member is secured to between the stationary member and a rotatable member; the second sealing member is secured to the stationary member.

In other certain embodiments, the housing includes a bearing cavity.

In a third aspect, there is provided a method for securing a seal assembly to a motor housing. The seal assembly seals a rotating shaft entering the housing from contaminants. The method includes securing a stationary member to the housing to surround the rotating shaft. A rotatable member is secured to an adjacent portion of the rotating shaft for rotation therewith. The rotatable member is positioned adjacent the stationary member to form a fluid passage therebetween. The fluid passage connects an interior of the housing and an exterior of the housing. A first sealing member and a second sealing member are provided to sealingingly divide the fluid passage into an interior section, an open section, and a sealed section. The interior section is exposed to the interior of the housing, the open section is exposed to an exterior of the housing and the sealed section is disposed between the interior section and the open section. A sensor is positioned in the sealed section to sense contaminants in the sealed section.

In certain embodiments, the rotatable member and the stationary member are formed such that they are intermeshed and form a labyrinth in the fluid passageway.

In other certain embodiments, providing the first sealing member includes forming the labyrinth in the open section.

In yet another embodiment, the method includes machining at least one chamber in the stationary member to house the sensor.

In still another embodiment, positioning the sensor in the sealed section includes positioning a sensor for detecting moisture in the sealed section.

In certain embodiments, the method further includes coupling the moisture sensor to a controller, which is configured to send a signal notifying the detection of a contaminant.

In other certain embodiments, providing the first sealing member comprises providing the elastomeric sealing ring and providing the second sealing member comprises providing an elastomeric sealing ring.

In yet another embodiment, providing the first and second sealing members includes securing the first and second sealing members on the stationary member to sealingly engage the rotatable shaft.

In still another embodiment, providing the first and second sealing members includes securing the first sealing member between the stationary member and the rotatable member and a second sealing member to the stationary member.

In yet another embodiment, securing a rotatable member to an adjacent portion of the rotating shaft includes securing a flinger to the rotating shaft.

In a fourth aspect, there is provided a method for detecting the loss of seal integrity. The seal has a first sealing member and the second sealing member spaced apart from the first sealing member and forming a sealed section for sealing a bearing cavity against contaminants. The method includes monitoring the sealed section with a sensor to detect the presence of contaminants in the sealed section.

In certain embodiments, detecting the presence of contaminants includes detecting moisture in the sealed section.

In other certain embodiments, monitoring the sealed section includes detecting the presence of moisture after the moisture reaches the first sealing member and prior to moisture entering the bearing cavity.

In yet another embodiment, in response to detecting the presence of contaminants, an alert is generated to communicate a loss of seal integrity.

Other aspects, features, and advantages will become apparent from the following detailed description when taken in conjunction with the accompanying drawings, which are part of this disclosure and which illustrate, by way of example, principles of the disclosure.

DETAILED DESCRIPTION

Figure 1:
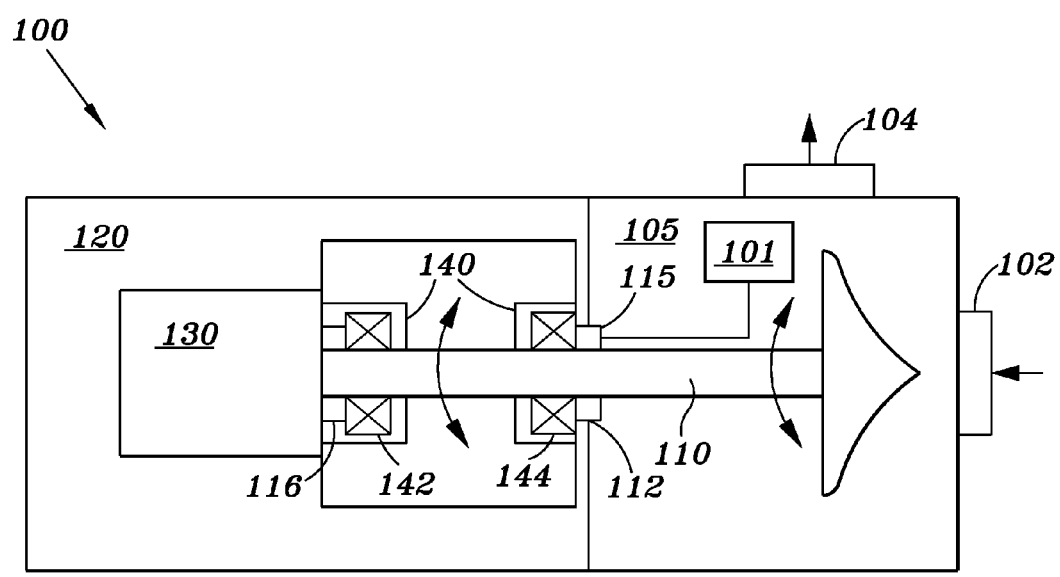
FIG. 1 is a schematic side view of a roto-dynamic pump system with a contaminant detection system.

FIG. 1 is a schematic view of a roto-dynamic pump system 100 in which a seal assembly 115 employs a contaminant detection system 101 to detect the presence of contaminants and thus a loss of integrity of the seal assembly 115 prior to the contaminants entering and contaminating a sealed region. In the embodiment illustrated in FIG. 1, the pump system 100 includes a pump 105, such as, for example, a centrifugal pump, for pumping fluids from a fluid inlet 102 through a fluid outlet 104. A motor 130 disposed inside a housing 120 drives the pump 105 via a rotating shaft 110 that extends through an opening 112 in the motor housing 120.

As depicted in FIG. 1, the shaft 110 is supported for rotational movement in the housing 120 by a pair of bearings 142 and 144. The seal assemblies 115 and a second seal assembly 116 are utilized to seal lubricants within bearing lubrication chambers 140 and prevent contamination. For example, the seal assembly 115 is secured to the housing 120 to prevent and/or otherwise substantially eliminate the likelihood of contaminants entering the housing 120 and lubrication chamber 140, and thus, contaminating and potentially causing damage to the bearing 144. As explained in greater detail below, the contaminant detection system 101 is configured to alert a user that the integrity of the seal assembly 115, for example, has been compromised prior to contaminants entering the lubrication chamber 140 to reduce or eliminate damage to the bearing 144.

Figure 2A:
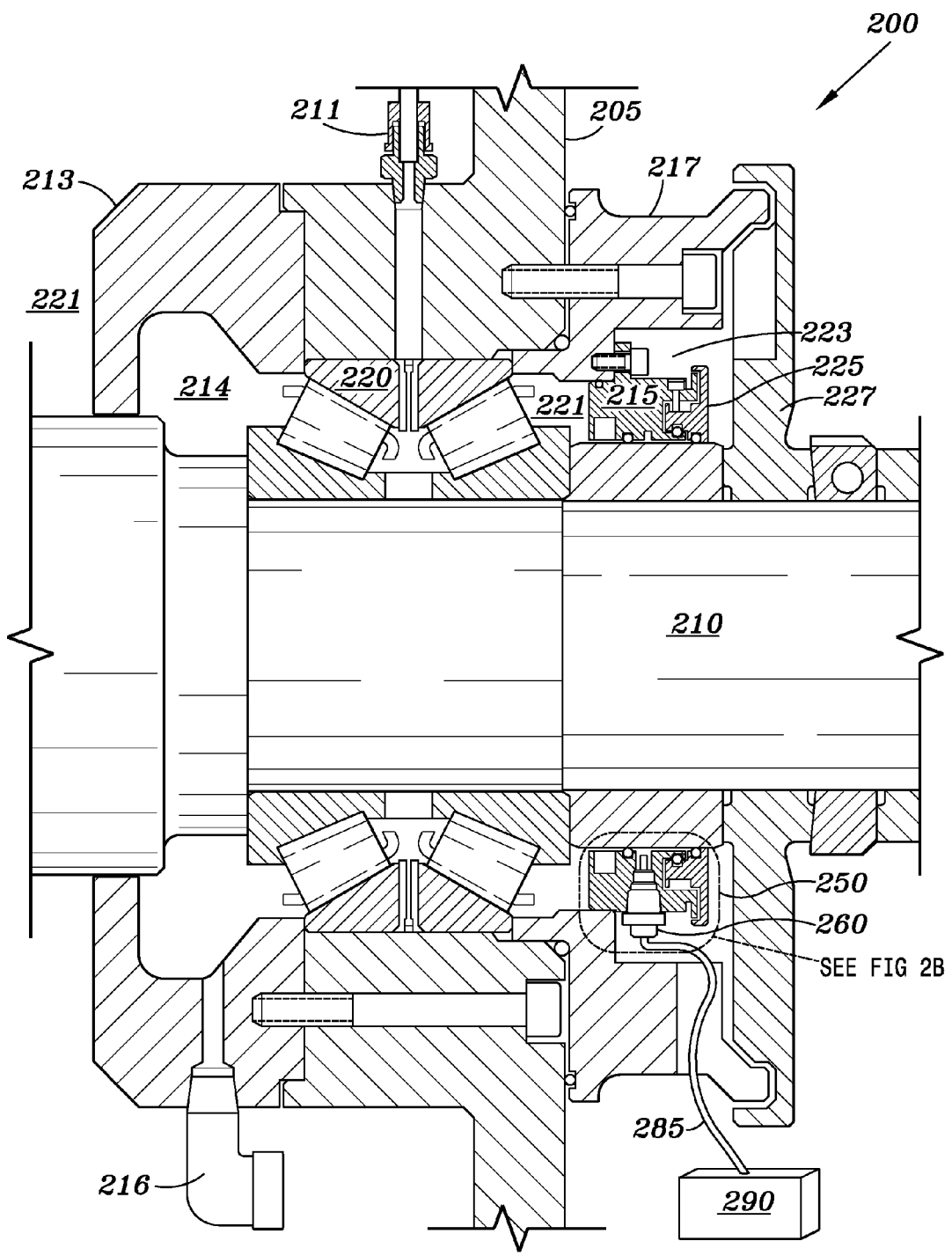
FIG. 2A is a cross-sectional side view of a seal assembly having the contaminant detection system.
Figure 2B:
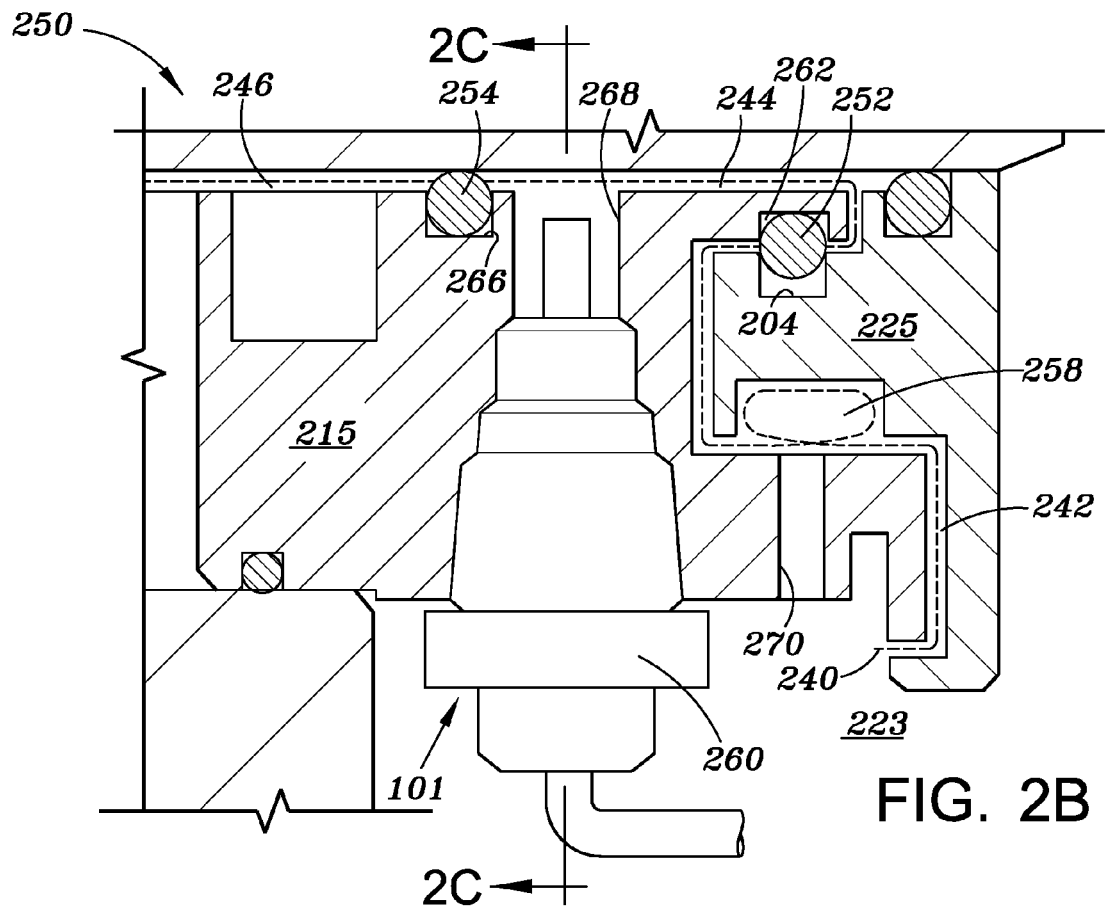
FIG. 2B is a close-up view of the seal assembly illustrated in FIG. 2A.
Figure 2C:
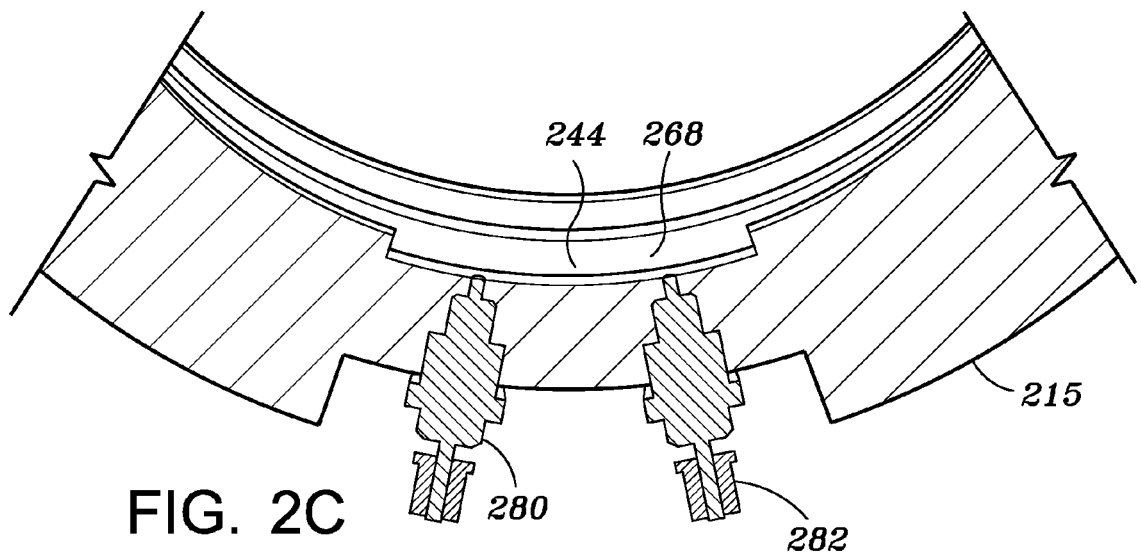
FIG. 2C is a cross-sectional view of the seal assembly illustrated in FIG. 2B taken along the line 2C-2C.

Referring to FIGS. 2A-2C, an embodiment of a roto-dynamic pump system 200 having a seal assembly 250 is illustrated. In the embodiment illustrated in FIGS. 2A-2C, the seal assembly 250 is configured to seal a fluid passageway 240 from contaminants. As seen specifically in FIG. 2B, the seal assembly 250 includes a first sealing member 252 and a second sealing member 254 spaced apart from the first sealing member 252, both encircling the shaft 210. The first sealing member 252 and the second sealing member 254 divide the fluid passageway 240 into an interior section 246, which is exposed to an interior 221 of a housing 205, an open section 242, which is exposed to an exterior area 223 surrounding the housing 205, and a sealed section 244, which is fluidically sealed between the interior section 246 and the open section 242. As discussed in greater detail below, the contaminant detection system 101 (FIG. 1) monitors the integrity of the seal assembly 250, and in particular, first and second sealing members 252 and 254, via one or more sensors 260 extending into the sealed section 244, by detecting the presence of contaminants (i.e., moisture and/or other unwanted substances) in the sealed section 244. Such detection inside the sealed section 244 provides an indication of a loss of integrity of the seal assembly 250 prior to such contaminants entering the interior 221 of the housing 205, and in particular, inside a bearing 220 causing damage thereto.

As illustrated in FIG. 2A, the interior 221 of the housing 205 is fluidically connected to the bearing 220 lubricated by lubricants provided through a lubrication port 211. Depending on the particular bearing type selected for the bearing 220, the lubricants include oil or grease or any other appropriate lubricating substances. The lubricants are retained in a lubrication chamber 214 formed within a lubrication housing 213, which is affixed to the housing 205. In the embodiment disclosed herein, the lubricants enter the chamber 214 through the port 211. Excess lubricant then purges through a lubricant drain 216 and into the housing 205.

The seal assembly 250 illustrated in FIGS. 2A and 2B includes stationary member 215 and a rotatable member 225 rotatably positioned adjacent the stationary member 215. In particular, the stationary member 215 surrounds the shaft 210 and is affixed to the housing 205 via an end cover 217, which is secured to and remains stationary with respect to the housing 205. The rotatable member 225 is positioned adjacent to the stationary member 215 and is affixed around the shaft 210 for rotation therewith. In the embodiment illustrated in FIG. 2A, a flinger 227 is optionally provided to be affixed around and rotatable with the shaft 210 such that during operation, the flinger 227 blocks contaminants and other debris from the seal assembly 250.

The rotatable member 225 is intermeshed with the stationary member 215 to form the open section 242 of the fluid passageway 240. Thus, the fluid passageway 240 is formed between an inner wall of the stationary member 215 and an outer surface of the shaft 210 and further extends between the passageway formed between the rotatable member 225 and the stationary member 215. In the embodiment illustrated in FIGS. 2A and 2B, the portion of the passageway 240 formed between the rotatable member 225 and the stationary member 215 extends radially outward to the exterior area 223 forming, in the embodiment illustrated in FIG. 2B, a labyrinth 258, which as explained in further detail below, acts as a seal during rotation of the shaft 210.

Referring specifically to FIG. 2B, the first sealing member 252 is secured within the fluid passageway 240 and is disposed within grooves 262 and 264 formed in the stationary member 215 and the rotatable member 225, respectively. The second sealing member 254 is secured around the stationary member 215 and is disposed in a groove 266 formed in the stationary member 215. According to some embodiments, the sealing members 252 and 254 are an elastomeric sealing ring, for example, a nitrile or nylon O-ring, sized to fit into the grooves 262, 264 and 266, respectively.

With continued reference to FIG. 2B, during rotation of the shaft 210 and the rotational member 225, centrifugal help prevent contaminant traveling through the labyrinth 258 in a direction towards the first sealing member 252. In this configuration, therefore, the function provided by the first sealing member 252 is to seal against contaminants that may pass through the labyrinth 258, which dynamically seals the sealed section 244. The centrifugal force expels and/or otherwise forces the contaminants disposed within the open section 242, including in labyrinth 258, through a port 270 formed through the stationary member 215 and into the exterior area 223. According to some embodiments, the seal assembly 250 is operable such that the first sealing member 252 is the labyrinth 258 such that the labyrinth and the second sealing member 254 formed the sealed section 244.

The contaminant detection system 101 includes a sensor 260 secured to the stationary member 215, the sensor 260 extending into an annular recess 268 formed within the sealed section 244 for sensing contaminants that migrate therein due to a loss of the integrity of the seal assembly 250. For example, in the event first seal 252 is damaged and fails to seal, the sensor 260 detects the presence of moisture or any other contaminants in the sealed section 244. In the embodiment illustrated in FIG. 2A, the sensor 260 is connected to a detection circuit 290 via a wired connection, although in alternate embodiments, such connection includes a wireless connection by way of example. In response to sensor 260 detecting contaminants, a signal is sent to the detection circuit 290, which in turn outputs an alarm signal to notify of a failure of the seal assembly 250. According to some embodiments, a single sensor 260 is used for detection; however, in other embodiments, two or more sensors 260 are secured to the stationary member 215 for improved accuracy and/or reliability. As illustrated in FIG. 2C, multiple sensors 280 and 282 are radially placed in the stationary member 215 and extend into the annular recess 268. The sensors 260 can be any type of sensor capable of detecting contaminants, such as, for example, a sensor for detecting moisture based on a change in conduction. For example, in the embodiment illustrated in FIG. 2C, the buildup of contaminants in the sealed section 244 provides a conductive path between a pair of sensors 280 and 282, which closes a circuit to trigger an alarm signal. According to some embodiments, based on the level of conductance, it is possible to identify which seal 252, 254 has failed. For example, oil has a different conductance than water and as such, an alarm can be configured alert an operator of a particular seal failure based on the type of fluid that breaches the seal assembly 250 (e.g., water breaching seal 252).

Figure 3:
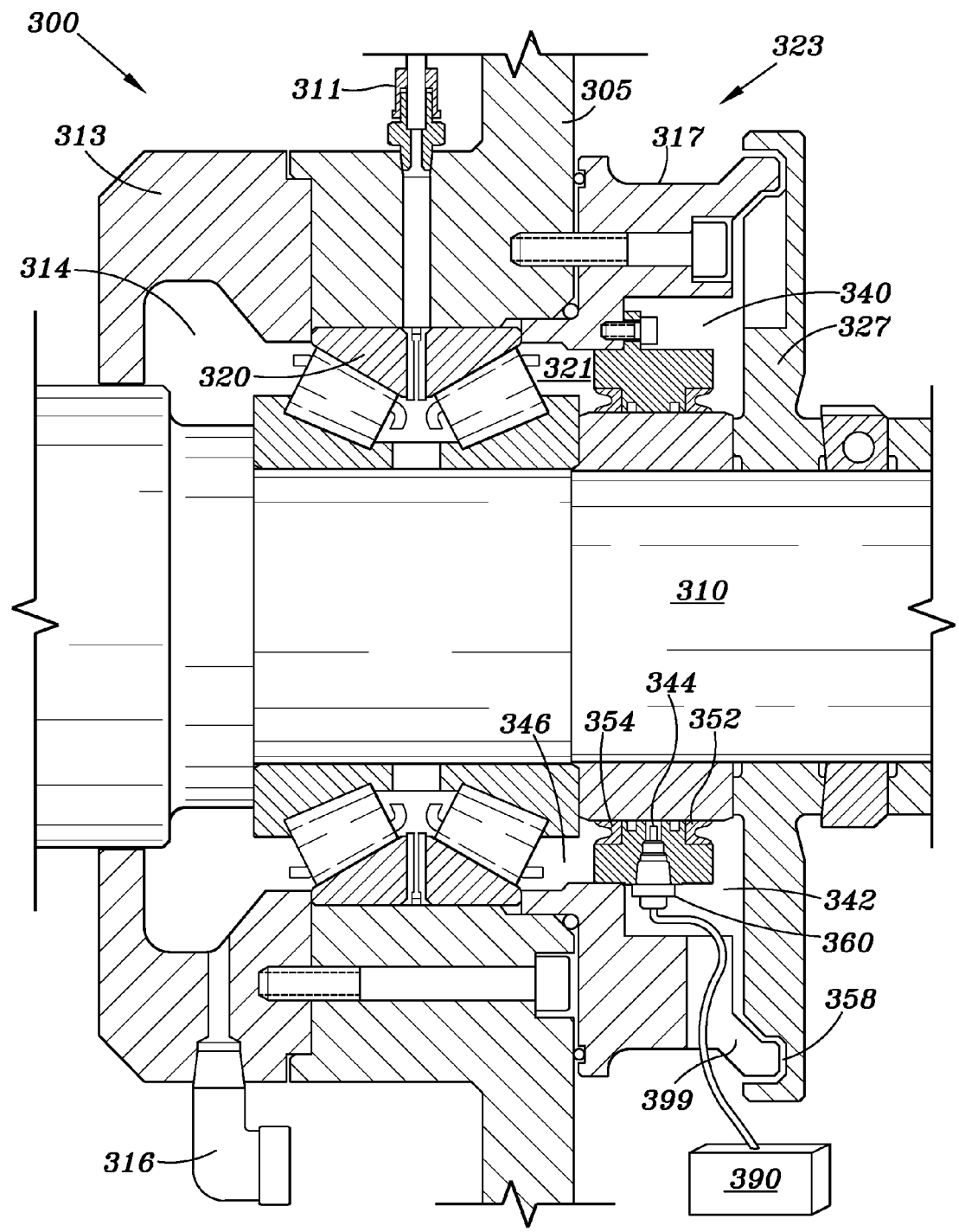
FIG. 3 is a cross-sectional side view of an additional embodiment of the seal assembly configured to detect contaminants.

FIG. 3 is a cross-sectional view of another seal assembly generally denoted as seal assembly 300. Similar to the seal assembly 250, the seal assembly 300 is employed by the pump system 100 or any other similar system. The seal assembly 300 is configured to seal a gap between a rotating shaft 310 and a housing 305 against contaminants entering from an exterior area 323.

In the embodiment illustrated in FIG. 3, the seal assembly 300 includes a stationary member 317 surrounding a shaft 310 and is affixed to the housing 305. A rotatable member 327, such as, for example, a flinger, is optionally affixed to the shaft 310 for rotation therewith. The rotatable member 327, when positioned adjacent to the stationary member 317, forms a fluid passage 340 connecting the interior 321 of the housing 305 to the exterior area 323. The interior 321 is fluidically connected to a lubrication chamber 314 formed within a lubrication housing 313. In operation, the lubrication port 311 provides a pathway for lubricants to enter the housing 305 in order to lubricate a bearing 320. The lubricants cycle through, in the case of oil, the bearing 320 and the lubrication chamber 314 and exit via a drain 316, for eventual return to the housing 305 through the lubrication port 311.

In the embodiment illustrated in FIG. 3, the seal assembly 300 includes a first sealing member 352 and a second sealing member 354, both secured to the stationary member 317. As illustrated, the sealing members 352 and 354 divide the fluid passage 340 into an interior section 346, an open section 342 and a sealed section 344 disposed between the interior section 346 and the open section 342. In the embodiment illustrated in FIG. 3, the interior section 346 is fluidly connected with the interior 321 of the housing 305 and the open section 342 is fluidly connected with the exterior area 323. At least one sensor 360 is disposed within the sealed section 344 and configured to sense the contaminants, such as, for example, moisture, present in the sealed section 344.

In some embodiments, the stationary member 317 and the rotatable member 327 are intermeshed with each other to form a labyrinth 358 in the open section 342 of the fluid passage 340. As previously described, the labyrinth 358 is configured to redirect contaminants away from the housing 305 in response to rotation of the shaft 310 and the rotatable member 327. In particular, the trapped contaminants are expelled from the open section 342 through a port 399 in the stationary member 317 in response to rotation of the rotatable member 327.

According to some embodiments, similar to sensor 260, the sensor 360 is a sensor for detecting moisture that has breached the first sealing member 352. The sensor 360 electronically coupled with an alarm system 390 that is configured to alert a user or operator of a failure of at least one of the first or second sealing member 352 or 354. In some embodiments, the first and second sealing members 352 are elastomeric sealing rings, although it should be understood that the sealing members 352 and 354 may be otherwise formed.

Embodiments disclosed herein also provide for a method for securing a seal assembly 250, 300 to a motor housing 120. The method includes securing a stationary member 217, 317 to the housing 205, 305 to surround a rotating shaft 210, 310 and hold the seal assembly 250, 350. A rotatable member 227, 327 is secured to an adjacent portion of the rotating shaft 210, 310 for rotation therewith. The rotatable member 227, 327 is positioned adjacent the stationary member 215, 317 and form a fluid passage 240, 340. The fluid passage 240, 340 connects an interior 221, 321 of the housing 205, 305 and an exterior area 223, 323 of the housing 205, 305. A first sealing member 252, 352 and a second sealing member 254, 354 are provided to sealingly divide the fluid passage 240, 340 into an interior section 246, 346, an open section 242, 342, and a sealed section 244, 344. The interior section 246, 346 is exposed to the interior 221, 321 of the housing 205, 305, the open section 242, 342 is exposed to the exterior area 223, 323 of the housing 205, 305 and the sealed section 244, 344 is disposed between the interior section 246, 346 and the open section 242, 342. A sensor 260, 360 is positioned in the sealed section 244, 344 to sense contaminants in the sealed section 244, 344.

The embodiments disclosed herein provide advantages such as, for example, the detection of a loss of integrity of a seal assembly such that repair and/or replacement of the seal can be performed prior to damage to bearings or contamination of the interior section. For grease filled assemblies, placing a sensor in grease will not necessarily detect the presence of contaminates. Clean grease can cover the sensing device during initial operation and thus contaminates may not be able to penetrate this grease to trigger the sensor. Further if the sensors only trigger when the lubricating media is contaminated, the negative effects on the bearings or sealed region may have already occurred. Thus, embodiments provided herein provide a sensor arrangement to detect presence of moisture or other contaminants after it breaches the primary or first seal and prior to entering the sealed region. Furthermore, embodiments provided herein isolate the sensor from grease or other lubrication to ensure detection ability.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but on the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A seal assembly for sealing a fluid passageway from contaminants, the fluid passageway formed by a rotating shaft entering an opening in a housing, the fluid passageway connecting an interior of the housing and an exterior of the housing, the seal assembly comprising:

a first sealing member having an inner diameter encircling the rotating shaft and a second sealing member having an inner diameter encircling the rotating shaft, the first and second sealing members dividing the fluid passage into an interior section exposed to the interior of the housing, an open section exposed to the exterior, and a sealed section fluidly sealed between the interior section and the open section, wherein the length of the inner diameter of the first sealing member is different length from the length of the inner diameter of the second sealing member, wherein the first sealing member and the second sealing member are secured to a stationary member surrounding the shaft and affixed to the housing; and a sensor disposed within the sealed section, the sensor configured to sense the contaminants within the sealed section.

2. The seal assembly of claim 1, further comprising:
a rotatable member secured to an adjacent portion of the shaft, the rotatable member and the stationary member dividing the fluid passage connecting the interior of the housing to the exterior of the housing.

3. The seal assembly of claim 2, wherein the first sealing member is secured between the rotatable member and the stationary member.

4. The seal assembly of claim 3, wherein the labyrinth is the first sealing member.

5. The seal assembly of claim 2, wherein the stationary member and the rotatable member are intermeshed to form a labyrinth in the fluid passageway.

6. The seal assembly of claim 5, further comprising a port formed in the stationary member extending from the labyrinth through the stationary member such that during rotation of the rotatable member, contaminants exit the labyrinth through the port prior to entering the sealed section.

7. The seal assembly of claim 2, wherein the rotatable member is a flinger.

8. The seal assembly of claim 2, wherein the sensor is secured to the stationary member and extends into an annular recess formed in the stationary member.

9. The seal assembly of claim 2, wherein the sensor is a sensor to detect moisture.

10. The seal assembly of claim 1, wherein the first sealing member is an elastomeric sealing ring and the second sealing member is an elastomeric sealing ring.

11. The seal assembly of claim 1, wherein the shaft couples a motor to a pump.

12. The seal assembly of claim 1, wherein the sensor is electronically coupled to a controller, the controller configured to send an alarm signal indicating the detection of a contaminant.

13. The seal assembly of claim 1, wherein the housing comprises a bearing cavity.

14. The seal assembly of claim 13, wherein the housing comprises a bearing cavity in a motor for a pump.

15. A motor for a pump, the motor comprising:
a housing;
a rotatable shaft extending through an opening in the housing; and
a seal assembly surrounding the shaft and sealing against contaminants outside the housing at the opening, the seal assembly comprising:
a stationary member surrounding the shaft and affixed to the housing;
a rotatable member secured to an adjacent portion of the shaft, the rotatable member and the stationary member forming a fluid passage connecting an interior of the housing to an exterior of the housing;
a first sealing member having an inner diameter encircling the rotatable shaft and a second sealing member having an inner diameter encircling the rotatable shaft, the first and second sealing members dividing the fluid passage into an interior section exposed to the interior of the housing, an open section exposed to the exterior of the housing, and a sealed section disposed between and sealed from the interior section and the open section, wherein the first sealing member inner diameter has a length that is different from a length of the second sealing member inner diameter, wherein the first sealing member and the second sealing member are secured to the stationary member; and
at least one sensor disposed within the sealed section, the sensor configured to sense the contaminants within the sealed section.

16. The motor of claim 15, wherein the stationary member and the rotatable member are intermeshed with each other to form a labyrinth in the fluid passageway.

17. The motor of claim 16, further comprising a port formed in the stationary member, the port extending from the labyrinth through the stationary member such that during rotation of the rotatable member, contaminants exit the labyrinth through the port prior to entering the sealed section.

18. The motor of claim 16, wherein the labyrinth is the first sealing member.

19. The motor of claim 15, wherein the at least one sensor is a sensor to detect moisture.

20. The motor of claim 15, wherein the first sealing member is an elastomeric sealing ring and the second sealing member is an elastomeric sealing ring.

21. The motor of claim 15, wherein the at least one sensor is electronically coupled to a controller configured to send a signal notifying the detection of a contaminant in the sealed section.

22. The motor of claim 15, wherein the sensor is secured to the stationary member and extends into an annular recess formed in the stationary member.

23. The motor of claim 15, wherein the first and second sealing members are secured to the stationary member to form the sealed section.

24. The motor of claim 15, wherein the first sealing member is secured between the stationary member and the rotatable member.

25. The motor of claim 15, wherein the housing comprises a bearing cavity.

26. A method for securing a seal assembly to a motor housing, the seal assembly sealing a rotating shaft entering the housing from contaminants, the method comprising:
securing a stationary member to the housing so as to surround the rotating shaft;
securing a rotatable member to an adjacent portion of the rotating shaft for rotation therewith;
positioning the rotatable member adjacent the stationary member to form a fluid passage therebetween, the fluid passage connecting an interior of the housing and an exterior of the housing;
providing a first sealing member having a first inner diameter encircling the rotating shaft and a second sealing member having a first inner diameter encircling the rotating shaft, the first and second sealing members positioned to sealingly divide the fluid passage into an interior section exposed to the interior of the housing, an open section exposed to an exterior of the housing, and a sealed section disposed between the interior section and the open section, wherein the first sealing member inner diameter has a length that is different from a length of the second sealing member, wherein the first sealing member and the second sealing member are secured to the stationary member to sealingly engage the rotatable shaft; and
positioning a sensor in the sealed section to sense contaminants in the sealed section.

27. The method of claim 26, further comprising forming the rotatable member and the stationary member such that they intermesh and form a labyrinth in the fluid passageway.

28. The method of claim 27, wherein providing the first sealing member comprises forming the labyrinth in the open section.

29. The method of claim 26, further comprising machining at least one chamber in the stationary member to house the sensor.

30. The method of claim 27, wherein positioning the sensor in the sealed section comprises positioning a sensor for detecting moisture in the sealed section.

31. The method of claim 26, further comprising coupling the moisture sensor to a controller configured to send a signal notifying the detection of a contaminant.

32. The method of claim 26, wherein providing the first sealing member comprises providing and elastomeric seal ring.

33. The method of claim 32, wherein providing the second sealing member comprises providing an elastomeric seal ring.

34. The method of claim 26, wherein providing the first and second sealing members comprises securing the first sealing member between the stationary member and the rotatable member.

35. The method of claim 26, wherein securing a rotatable member to an adjacent portion of the rotating shaft for rotation therewith includes securing a flinger to the rotating shaft.

36. A method for detecting the loss of seal integrity, the seal having a first sealing member, a second sealing member, and a third sealing member forming a sealed section for sealing a bearing cavity against contaminants, the method comprising:
    positioning a first sealing member having an inner diameter around a rotating shaft;
    positioning a second sealing member having an inner diameter around the rotating shaft;
    positioning a third sealing member between the first and second sealing members, the first, second and third sealing members forming the sealed section, the third sealing member having an inner diameter around the rotating shaft of a length different from a length of the first and second sealing member inner diameters, wherein the first and second sealing members are secured to a stationary member of the seal and the third sealing member is secured to a rotating member of the seal; and
    monitoring the sealed section with a sensor to detect the presence of contaminants in the sealed section.

37. The method of claim 36, wherein detecting the presence of contaminants comprises detecting moisture in the sealed section.

38. The method of claim 36, wherein monitoring the sealed section further comprises detecting the presence of moisture after the moisture breaches the first sealing member and prior to the moisture entering the bearing cavity.

39. The method of claim 36, wherein in response to detecting the presence of contaminants, generating an alert to communicate a loss of seal integrity.

40. A seal assembly for sealing a fluid passageway from contaminants, the fluid passageway formed by a rotating shaft entering an opening in a housing, the fluid passageway connecting an interior of the housing and an exterior of the housing, the seal assembly comprising:
    a first sealing member and a second sealing member dividing the fluid passage into an interior section exposed to the interior of the housing, an open section exposed to the exterior, and a sealed section fluidly sealed between the interior section and the open section;
    a stationary member surrounding the shaft and affixed to the housing, wherein the first sealing member and the second sealing member are secured to the stationary member;
    a rotatable member secured to an adjacent portion of the shaft, the rotatable member and the stationary member dividing the fluid passage connecting the interior of the housing to the exterior of the housing, wherein the stationary member and the rotatable member are intermeshed to form a labyrinth in the fluid passageway;
    a port formed in the stationary member extending from the labyrinth through the stationary member such that during rotation of the rotatable member, contaminants exit the labyrinth through the port prior to entering the sealed section; and
    a sensor disposed within the sealed section, the sensor configured to sense the contaminants within the sealed section.

41. A method for securing a seal assembly to a motor housing, the seal assembly sealing a rotating shaft entering the housing from contaminants, the method comprising:
    securing a stationary member to the housing so as to surround the rotating shaft;
    securing a rotatable member to an adjacent portion of the rotating shaft for rotation therewith;
    positioning the rotatable member adjacent the stationary member to form a fluid passage therebetween, the fluid passage connecting an interior of the housing and an exterior of the housing;
    providing a first sealing member and a second sealing member on the stationary member to sealingly divide the fluid passage into an interior section exposed to the interior of the housing, an open section exposed to an exterior of the housing, and a sealed section disposed between the interior section and the open section; and
    positioning a sensor in the sealed section to sense contaminants in the sealed section.

* * * * *